No. 880,783. PATENTED MAR. 3, 1908.
G. ERLWEIN & E. MARQUARDT.
PROCESS OF REGENERATING WATER IN RESERVOIRS CONTAINING
AQUATIC ANIMALS.
APPLICATION FILED OCT. 11, 1907.
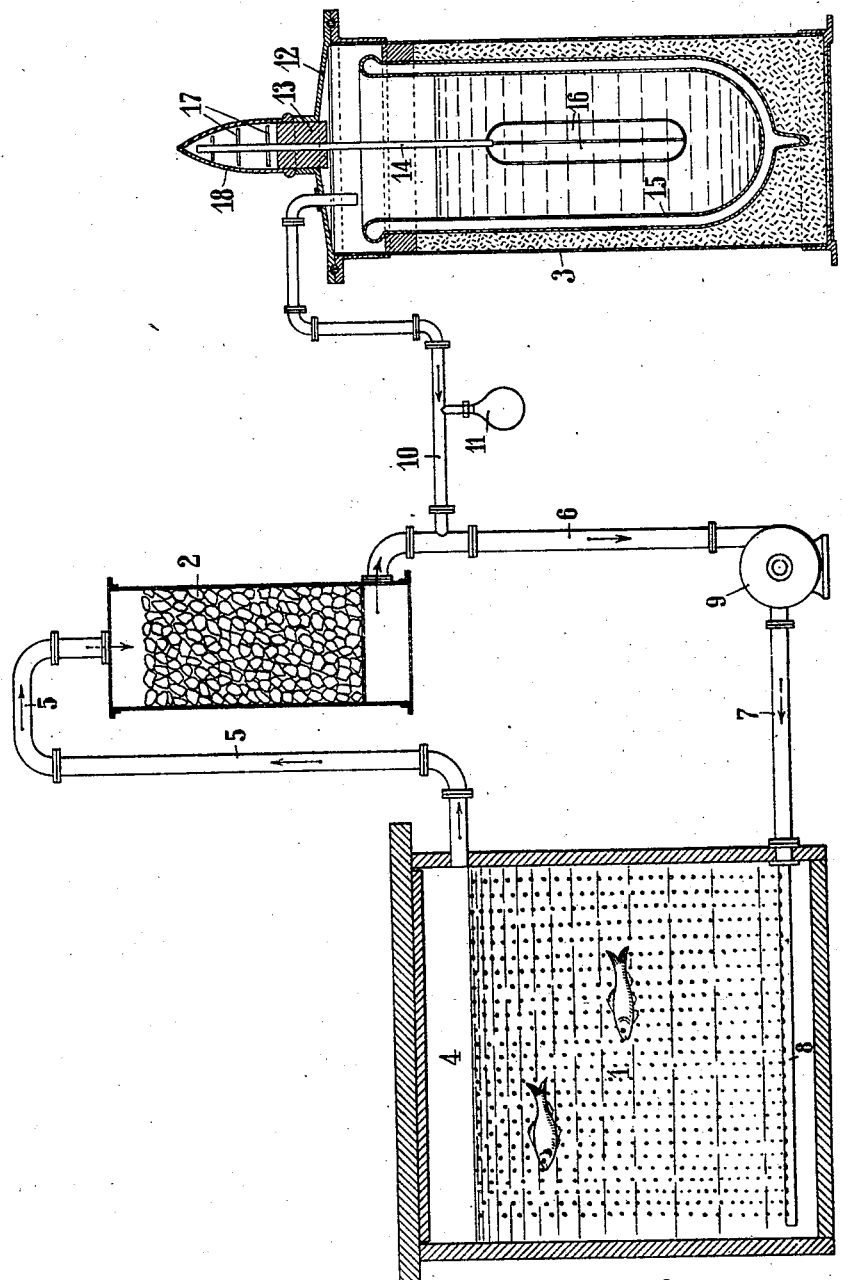

UNITED STATES PATENT OFFICE.

GEORG ERLWEIN, OF CHARLOTTENBURG, AND ERNST MARQUARDT, OF CAROW, NEAR BERLIN, GERMANY.

PROCESS OF REGENERATING WATER IN RESERVOIRS CONTAINING AQUATIC ANIMALS.

No. 880,783.           Specification of Letters Patent.        Patented March 3, 1908.

Application filed October 11, 1907. Serial No. 396,908.

*To all whom it may concern:*

Be it known that we, GEORG ERLWEIN, residing at Charlottenburg, Germany, and ERNST MARQUARDT, residing at Carow, near Berlin, Germany, both subjects of the German Emperor, have invented certain new and useful Improvements in a Process for Regenerating Water in Reservoirs Containing Aquatic Animals, of which the following is a specification.

This invention relates to a process for regenerating water in reservoirs containing aquatic animals and consists in driving out the air, breathed out by the animals, from the water, then eliminating the carbon dioxid from and adding oxygen to this air and finally leading back the air thus regenerated into the water.

The process will be explained with reference to the accompanying drawing.

1 is the reservoir or receptacle for receiving the aquatic animals, which is closed by a lid. 2 is an apparatus for absorbing carbonic acid filled for instance with lime, 3 is a supply source for oxygen, which may be liquefied oxygen or liquefied atmospheric air. The upper space of the apparatus 2 for absorbing carbonic acid is connected with the air-space 4 of the reservoir 1 by a pipe 5, while from the lower space of the apparatus 2 for absorbing carbonic acid a conduit of pipes 6, 7 leads to the lower part of the reservoir 1. The part 8 of this conduit of pipes is provided with holes; between the pipes 6 and 7 is placed a pump 9. The supply-source 3 for the oxygen is connected with the pipe 6 through a pipe 10, into which is placed a pressure-regulator 11.

While the water remains in the reservoir 1 the air under the action of the pump 9 makes the following circular course: From the space 4 of the reservoir 1 the air charged with carbonic acid is conducted through the pipe 5 into the upper part of the apparatus 2 for the absorption of carbonic acid, it gives off to the absorbing-medium (for instance lime) the carbonic acid and enters freed from carbonic acid into the pipe 6, to which is also conducted fresh oxygen from the supply-source 3 through the pipe 10. The air freed from the carbonic acid and enriched with fresh oxygen finally passes through the pipe 7 into the pipe 8 provided with holes, ascends through the holes of the last-named pipe in the reservoir and, charged with carbonic acid, to repeat the circular course and so on.

The supply-source 3 for the oxygen is preferably formed as follows: 3 is an airtight closed metal cylinder lined with an insulating mass, through whose lid 12 passes and reaches down into the evaporating-vessel 15 filled with liquid gas a rod, tube or wire 14, or the like, held by a stopper 13, which rod 14 is made of a good heat conducting material such as metal. The metal rod 14, in order to enlarge its surfaces, may be provided at both ends with ribs 16 and 17. The upper end with the ribs 17 can be protected by a hood 18 of glass or any other suitable material.

By the just described arrangement the development of the gas from the liquefied oxygen or the liquefied air is accelerated: The cross-section and the surface of the rod 14 are of such a size that the part projecting out of the evaporating-vessel 15 can receive through radiation and conduction the heat necessary for the desired speed of the evaporation, and that the part of the rod within the evaporating-vessel gives off again these quantities of heat. The speed of the evaporation can be regulated within narrow limits by varying the depth at which the rod 14 plunges into the vessel 15.

What we claim as our invention and desire to secure by Letters Patent is:—

1. A process for regenerating water in reservoirs, containing aquatic animals, consisting in driving out the air breathed out by the animals from the water, then eliminating the carbon dioxid from and adding oxygen to this air and finally leading back the air thus regenerated into the water.

2. A process for regenerating water in reservoirs, containing aquatic animals, consisting in driving out the air breathed out by the animals from the water, then eliminating the carbon dioxid by conducting the air through a material absorbing carbon dioxid and finally leading back the air thus regenerated into the water.

In testimony whereof I have signed this specification in the presence of two subscribing witnesses.

GEORG ERLWEIN.
                ERNST MARQUARDT.

Witnesses:
    WOLDEMAR HAUPT,
    HENRY HASPER.